United States Patent
Yamamoto

(10) Patent No.: US 11,863,722 B2
(45) Date of Patent: Jan. 2, 2024

(54) CONDUCTIVE MEMBER AND IMAGE FORMING APPARATUS

(71) Applicant: CANON KABUSHIKI KAISHA, Tokyo (JP)

(72) Inventor: Daisuke Yamamoto, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 253 days.

(21) Appl. No.: 17/142,540

(22) Filed: Jan. 6, 2021

(65) Prior Publication Data
US 2021/0234985 A1 Jul. 29, 2021

(30) Foreign Application Priority Data
Jan. 27, 2020 (JP) .................................. 2020-011000

(51) Int. Cl.
*H04N 1/04* (2006.01)
*H04N 1/00* (2006.01)

(52) U.S. Cl.
CPC ..... *H04N 1/00994* (2013.01); *H04N 1/00557* (2013.01)

(58) Field of Classification Search
CPC .............. H04N 1/00994; H04N 1/00557
USPC .......................................... 358/305
See application file for complete search history.

(56) References Cited

U.S. PATENT DOCUMENTS

| 6,872,082 B2* | 3/2005 | Hsu ..................... H01R 13/2457 439/91 |
| 9,601,842 B2* | 3/2017 | Lee .......................... H05K 1/18 |
| 2008/0088331 A1* | 4/2008 | Yoshida ............... G01R 1/0466 324/755.05 |
| 2012/0196491 A1* | 8/2012 | Dai ...................... H01R 12/714 439/709 |

FOREIGN PATENT DOCUMENTS

JP 2010-000661 A 1/2010

* cited by examiner

*Primary Examiner* — Cheukfan Lee
(74) *Attorney, Agent, or Firm* — VENABLE LLP

(57) ABSTRACT

A conductive member includes a connection portion which is to be electrically connected to a cutaway portion of a metal plate. The connection portion includes a first arm portion extending from one end to another end and configured to come into contact with one face of two faces opposed to each other of the cutaway portion, a first bent portion connected to the another end of the first arm portion and bent extending from the another end toward the one end, a second bent portion connected to the first bent portion and bent getting closer toward the first arm portion as getting away from the first bent portion, and a third bent portion connected to the second bent portion and bent getting away from the first arm portion as getting away from the second bent portion so as to come into contact with another face of the two faces.

18 Claims, 7 Drawing Sheets

CONDUCTIVE MEMBER AND IMAGE FORMING APPARATUS

BACKGROUND OF THE INVENTION

Field of the Invention

The present invention relates to a conductive member and an image forming apparatus.

Description of the Related Art

An image forming apparatus includes a variety of metal plates disposed therein, such as a frame for holding a light scanning apparatus. The metal plates themselves serve as antennas, and may emit noises generated inside and outside the image forming apparatus to an inside and an outside of the image forming apparatus. To prevent such noises and radio frequency interference (RFI), the meal plates inside the image forming apparatus need to be grounded. In related art, internal metal plates are fastened to a metal side plate of the image forming apparatus with screws and are grounded via the side plate.

In recent years, from the perspective of downsizing and a high degree of freedom in molding, there has been a trend of forming the side plate of the image forming apparatus with plastic. Therefore, grounding cannot be performed by the method of the related art. Provision of an additional metal plate to the image forming apparatus for the purpose of grounding causes the increases in the number of assembly steps and a cost for the image forming apparatus. Therefore, addition of the metal plate for grounding is minimized, and a member that has been connected to the metal plate and has already been grounded (hereinafter referred to as "already grounded member") is connected to a member that has been ungrounded (hereinafter referred to as "grounded member") in the following manner. For example, there has been proposed a method of fastening the grounded member and the already grounded member to each other with a screw when the grounded member and the already grounded member are disposed close to each other. Further, in another case, the grounded member and the already grounded member are connected to each other through intermediation of a plate spring or a wire spring which is a conductive member for connection therebetween (hereinafter referred to as "relay member") when the grounded member and the already grounded member are disposed far apart from each other. Further, for example, there has been proposed a method of connecting an image forming apparatus and an optional apparatus to each other with a ground spring (Japanese Patent Application Laid-Open No. 2010-000661).

However, when the plate spring is used as the relay member, a degree of freedom in molding and a degree of freedom in arrangement may become lower, and a length of the relay member may become larger. As a result, there is a fear in that the apparatus is increased in size and cost. Further, when the wire spring is used as the relay member, the wire spring may be bent during transportation of the apparatus, or be detached from a connection portion between the grounded member and the already grounded member. As a result, there is a fear in that reliable electrical conduction is impaired. In view of the problems described above, regarding an image forming apparatus for which reduction in size and price is demanded, it is required to provide a relay member having a high degree of freedom in arrangement, being inexpensive, and having reliable electrical conduction.

SUMMARY OF THE INVENTION

The present invention has been made under such a circumstance, and has an object to provide a conductive member having a high degree of freedom in arrangement, being inexpensive, and having reliable electrical conduction.

In order to solve the above-mentioned problems, according to an embodiment of the present invention, there is provided a conductive member which is to be electrically connected to a metal plate member having a cutaway portion having two faces opposed to each other, the conductive member comprising a connection portion which is to be connected to the cutaway portion, wherein the connection portion comprises: a first arm portion, which extends from one end to another end, and is configured to come into contact with one face of the two faces of the cutaway portion; a first bent portion, which is connected to the another end of the first arm portion, and is bent in such a manner as to extend from the another end toward the one end; a second bent portion, which is connected to the first bent portion, and is bent getting closer toward the first arm portion as getting away from the first bent portion; and a third bent portion, which is connected to the second bent portion, and is bent getting away from the first arm portion as getting away from the second bent portion so as to come into contact with another face of the two faces of the cutaway portion.

There is provided an image forming apparatus configured to form an image on a recording material, the image forming apparatus comprising: a conductive member; a ground member which is connected to a ground; and a grounded member which is not connected to the ground, wherein the conductive member is electrically connected to a metal plate member having a cutaway portion having two faces opposed to each other, wherein the conductive member comprises a connection portion which is connected to the cutaway portion, wherein the connection portion comprises: a first arm portion, which extends from one end to another end, and is in contact with one face of the two faces of the cutaway portion; a first bent portion, which is connected to the another end of the first arm portion, and is bent in such a manner as to extend from the another end toward the one end; a second bent portion, which is connected to the first bent portion, and is bent getting closer toward the first arm portion as getting away from the first bent portion; and a third bent portion, which is connected to the second bent portion, and is bent getting away from the first arm portion as getting away from the second bent portion so as to be in contact with another face of the two faces of the cutaway portion, and wherein one of the ground member and the grounded member is the metal plate member, and the ground member and the grounded member are connected to each other by the conductive member.

There is provided an image forming apparatus configured to form an image on a recording material, the image forming apparatus comprising: a conductive member; a ground member, which is connected to a ground, and is a metal plate member having a first cutaway portion having two faces opposed to each other; and a grounded member, which is not connected to the ground, and is a metal plate member having a second cutaway portion having two faces opposed to each other, wherein the conductive member comprises a first connection portion and a second connection portion, wherein each of the first connection portion and the second connection portion comprises: a first arm portion, which extends from one end to another end, and is in contact with one face of the two faces of a corresponding one of the first cutaway portion and the second cutaway portion; a first bent portion, which is connected to the another end of the first arm portion, and is bent in such a manner as to extend from the another end toward the one end; a second bent portion, which is connected to the first bent portion, and is bent getting closer toward the first arm portion as getting away from the first bent portion; and a third bent portion, which is connected to the second bent portion, and is bent getting away from the first arm portion as getting away from the second bent portion so as to be in contact with another face of the two faces of the corresponding one of the first cutaway portion and the second cutaway portion, wherein the first connection portion is connected to the first cutaway portion of the ground member so that the ground member and the conductive member are electrically connected to each other, wherein the second connection portion is connected to the second cutaway portion of the grounded member so that the grounded member and the conductive member are electrically connected to each other, and wherein the ground member and the grounded member are connected to each other by the conductive member.

Further features of the present invention will become apparent from the following description of exemplary embodiments with reference to the attached drawings.

DESCRIPTION OF THE EMBODIMENTS

[Image Forming Apparatus]

Figure 1A:
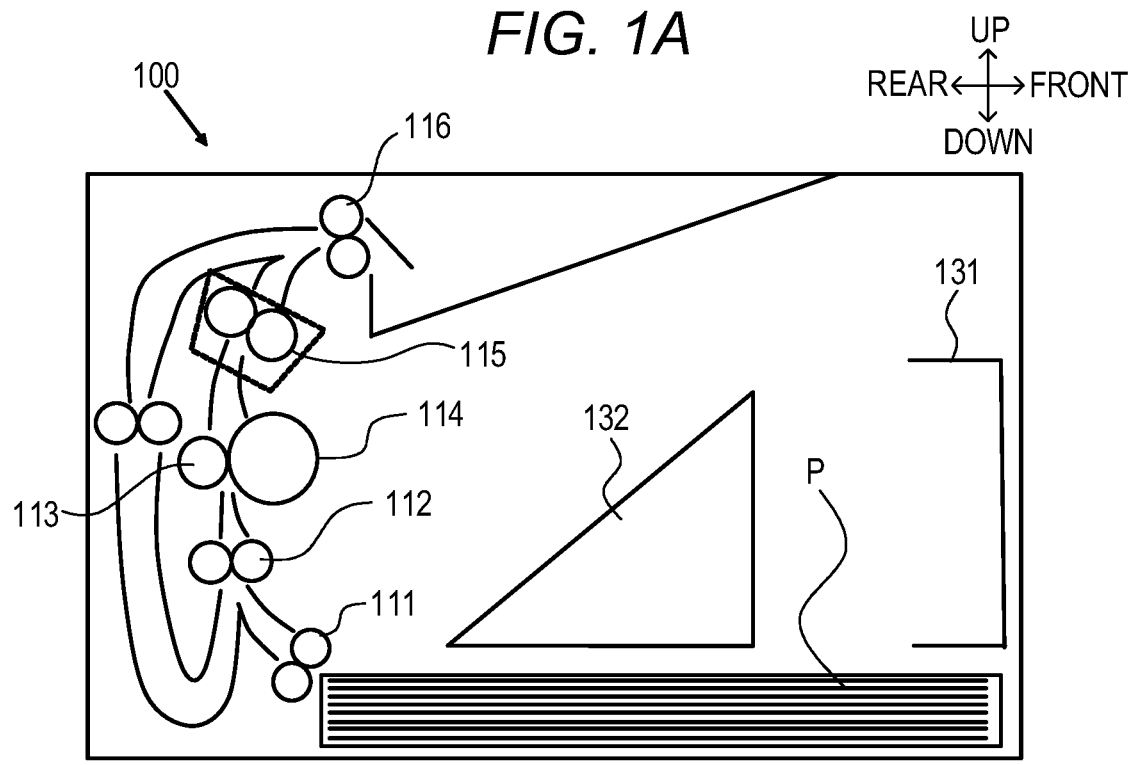
FIG. 1A is a schematic cross-sectional view for illustrating a configuration of a printer.

An image forming apparatus, to which conductive members described in first to fourth embodiments are applied, is described with reference to FIG. 1A and FIG. 1B. In the first to fourth embodiments, a laser beam printer (hereinafter referred to as "printer") 100 as an example of the image forming apparatus. FIG. 1A is a schematic cross-sectional view for illustrating a configuration of the printer 100. In FIG. 1A, the right side corresponds to a front side of the printer 100, the left side corresponds to a rear side of the printer 100, the lower side corresponds to a lower side of the printer 100, and the upper side corresponds to an upper side of the printer 100. The printer 100 includes an image forming unit, a sheet feeding device, a laser scanner unit, a fixing device 115, and a discharge tray. The image forming unit is configured to form an image. The sheet feeding device is configured to separately feed sheets P being recording materials to the image forming unit. The image forming unit includes a process cartridge and a transfer roller 113. The process cartridge is mountable to and detachable from a main body of the printer 100. The process cartridge includes a photosensitive drum 114, a charging roller (not shown), a developing device (not shown), and a cleaning device (not shown). The printer 100 includes a control unit (not shown) and a power supply (not shown). The control unit is configured to control the above-mentioned components and process image information. The power supply is configured to supply power to the components.

Image information is transmitted to the printer 100 from an external device such as a personal computer, and the control unit executes image forming processing on the image information and generates a print signal. Then, feed rollers 111 rotate, and the sheet P stacked in a feeding cassette are conveyed to the transfer roller 113 by conveyance rollers 112. A latent image is formed on the photosensitive drum 114 in accordance with the image information as well as a print command, and a toner image is formed by developing the latent image. The toner image on the photosensitive drum 114 is transferred to the sheet P by the transfer roller 113. Accordingly, the image is formed on the sheet P. The sheet P is conveyed to the fixing device 115, and the unfixed toner image on the sheet P is fixed. After that, the sheet P is discharged onto the discharge tray by discharge rollers 116. Further, in a case in which duplex printing is performed on the sheet P, the sheet P is sent to the fixing device 115, is turned over on the discharge rollers 116, passes through a duplex-printing path, and is again sent to the image forming unit. An image is then formed on a second side of the sheet P, and the sheet P is discharged onto the discharge tray. The laser scanner unit is housed in, for example, a frame (hereinafter referred to as "center reinforcing member") 132 made of a metal plate. The printer 100 includes a front reinforcing member 131 for reinforcement.

Figure 1B:
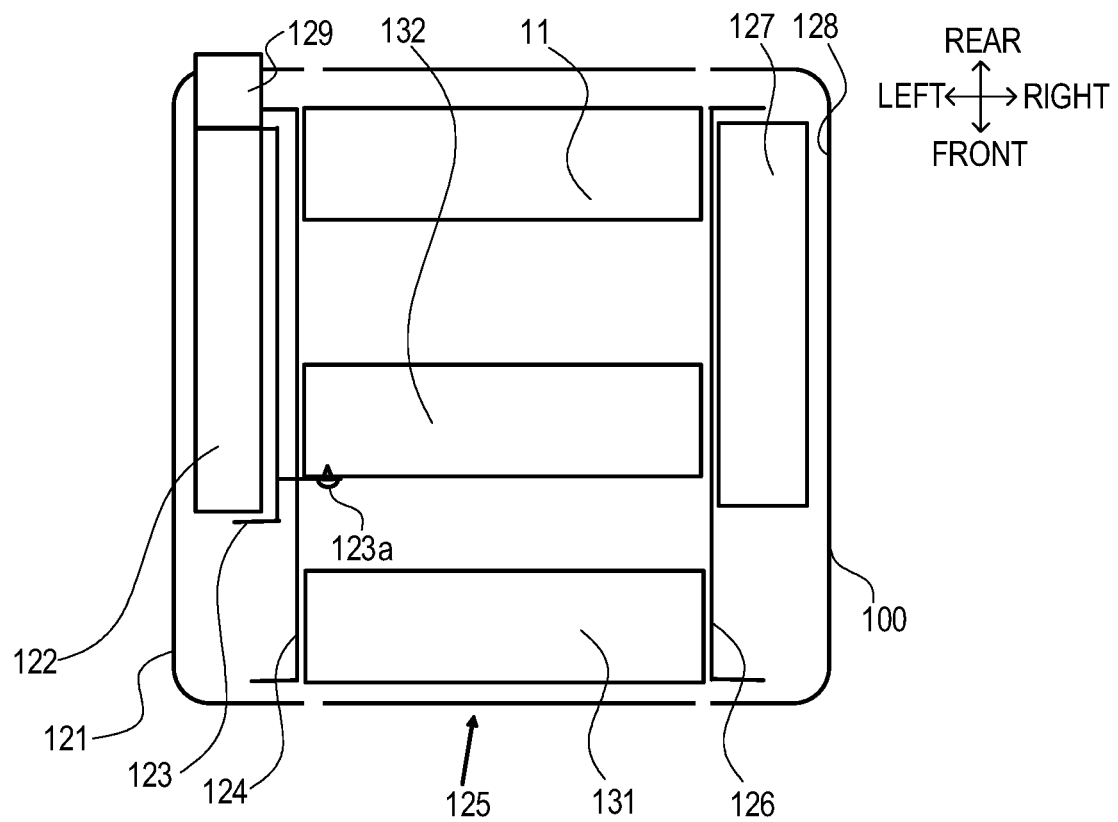
FIG. 1B is a schematic view for illustrating a main part of the printer as viewed from above.

FIG. 1B is a schematic view for illustrating a main part of the printer 100 as viewed from above. In FIG. 1B, the right side corresponds to the right side of the printer 100, the left side corresponds to the left side of the printer 100, the lower side corresponds to the front side of the printer 100, and the upper side corresponds to the rear side of the printer 100. The main body of the printer 100 includes, in order from the left, a left exterior 121, an electric board 122, an electric board metal plate 123, a left side plate 124, a sheet passing area 125, a right side plate 126, a driving area 127, and a right exterior 128. Note that the "sheet passing" means conveyance of the sheets P. The sheet passing area 125 is an area in conformity with a sheet having the largest length in a direction orthogonal to a conveyance direction among the sheets P to be used for the printer 100.

An input terminal 129 including a ground terminal is connected to the electric board 122 and the electric board metal plate 123. The electric board 122 and the electric board metal plate 123 are connected to commercial power and grounded via a power cable connected to the input terminal 129. For the electric board 122 made of an insulator, a copper foil pattern which forms a circuit on the electric board 122 is connected to the ground terminal of the input terminal 129, thus allowing the circuit on the electric board 122 to be grounded. As a result, the electric board metal plate 123 is a grounded member. Note that the ground member that has been grounded is referred to as an already grounded member. Various metal components in the printer 100 are connected to the electric board metal plate 123 being the already grounded member, and thus are grounded via the electric board metal plate 123.

The front reinforcing member 131, the center reinforcing member 132, and a conveyance unit 11 are disposed in the sheet passing area 125, in order from the front side (near side) to the rear side of the printer 100. The conveyance unit 11 includes a mold component in which the feed rollers 111 and the conveyance rollers 112 are mounted, and the fixing device 115. The front reinforcing member 131 and the center reinforcing member 132 are each made of a metal plate. The center reinforcing member 132 serves also as a scanner frame for supporting the laser scanner. The electric board metal plate 123 and the center reinforcing member 132 are disposed at a position at which the electric board metal plate 123 and the center reinforcing member 132 can be in direct contact with each other. The center reinforcing member 132 is electrically connected to the electric board metal plate 123 by fastening with a metal screw 123a for reliable contact with the electric board metal plate 123. This enables the center reinforcing member 132 to be grounded and thus become an already grounded member. Meanwhile, the front reinforcing member 131 is disposed at a position apart from the electric board metal plate 123. Thus, the reinforcing member 131 cannot be grounded by screw fastening. Like the front reinforcing member 131, a member that fails to be directly connected to the electric board metal plate 123 and to be grounded is referred to as a grounded member.

The left side plate 124 and the right side plate 126 support the front reinforcing member 131, the center reinforcing member 132, and the conveyance unit 11 from both sides in the sheet passing area 125. The left side plate 124 and the right side plate 126 are each made of a mold. In a case in which the left side plate 124 and the right side plate 126 are each made of a metal plate as in a related-art method, any one of right and left end portions of the front reinforcing member 131 can be fastened with a screw to establish a ground. However, such a method cannot be used for the printer 100. Thus, it is required that the front reinforcing member 131 made of the metal plate be grounded by another method. The already grounded member is described below as the center reinforcing member 132, and the grounded member is described below as the front reinforcing member 131. However, the already grounded member and the grounded member are not limited to. Any metal plate disposed in the printer 100 may be used as the already grounded member and the grounded member.

EMBODIMENTS

Figure 2A:
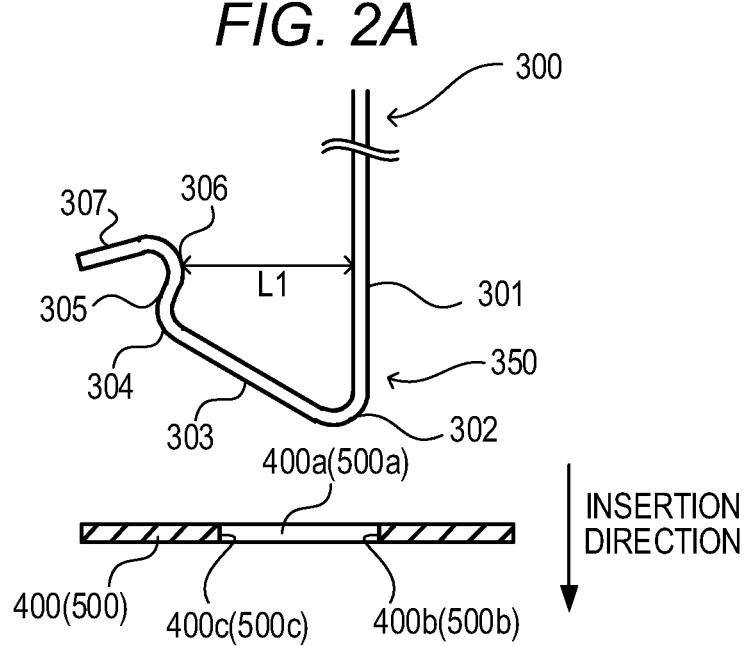
FIG. 2A and FIG. 2B are views for illustrating a main part of a connection portion of a wire spring relay member according to first to fourth embodiments.
Figure 2B:
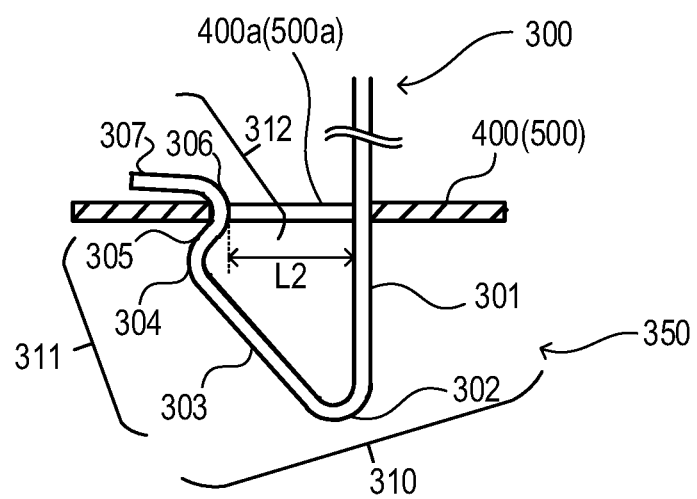
Figure 2C:
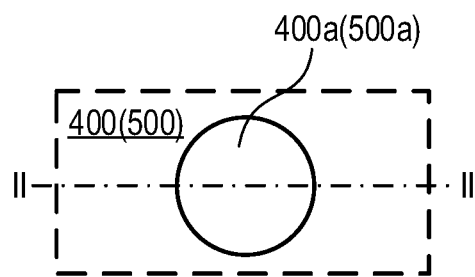
FIG. 2C is a top view of a through-hole.

A wire spring relay member 300 is descried as a conductive member according to the embodiments for electrically connecting a grounded member and an already grounded member, which is a metal plate member, and establishing a ground. FIG. 2A and FIG. 2B are views for illustrating a connection portion 350 that is a characteristic configuration of the wire spring relay member 300. FIG. 2A is an enlarged view for illustrating a main part before connection between the connection portion 350 of the wire spring relay member 300 and the grounded member 400 or the already grounded member 500. FIG. 2B is an enlarged view for illustrating the main part during the connection between the connection portion 350 of the wire spring relay member 300 and the grounded member 400 or the already grounded member 500. FIG. 2C is a top view of a through-hole 400a of the grounded member 400 or a through-hole 500a of the already grounded member 500. As illustrated in FIG. 2A, the grounded member 400 (already grounded member 500) has the through-hole 400a (500a) as an example of a cutaway portion. FIG. 2A and FIG. 2B are cross-sectional views of the grounded member 400 (already grounded member 500) taken along the line II-II of FIG. 2C. One cut face of the through-hole 400a (500a) is a first cut face 400b (500b), and another cut face is a second cut face 400c (500c). Here, it is only required that the first cut face 400b (500b) and the second cut face 400c (500c) be two end portions opposed to each other. It is not always required that the two end portions opposed to each other be formed by cutting.

(Wire Spring Relay Member)

The wire spring relay member 300 includes a first arm portion 301, a first bent portion 302, and a second arm portion 303. The first arm portion 301 extends from one end to another end, and is configured to come into contact with the first cut face 400b (500b), which is one face of the through-hole 400a (500a), when the wire spring relay member 300 is connected to the grounded member 400 (already grounded member 500). In the embodiments, the grounded member 400 (already grounded member 500) has the through-hole 400a (500a). However, the grounded member 400 (already grounded member 500) may have such a shape as to nip the wire spring relay member 300, for example, a cutaway portion. In other words, the first cut face 400b (500b) and the second cut face 400c (500c) may be a first cutaway portion and a second cutaway portion, respectively. The second arm portion 303 extends between the first bent portion 302 and a second bent portion 304, which is described below, in such a manner as to form an acute angle with respect to the first arm portion 301 at least in an assembled state of the wire spring relay member 300.

The first bent portion 302 is connected to the another end of the first arm portion 301, and is bent in such a manner as to extend from another end toward one end. The second arm portion 303 is disposed between the first bent portion 302 and the second bent portion 304 in such a manner as to form an acute angle of less than 90° with respect to the first arm portion 301 before assembly of the wire spring relay member 300. Accordingly, the first bent portion 302 serves as a forward end for insertion so that the first bend portion 302 can easily be inserted into the through-hole 400a (500a). Further, the first arm portion 301 slides along the first cut face 400b (500b) when the first bent portion 302 is inserted into the through-hole 400a (500a), and thus serves also as a guide.

The wire spring relay member 300 includes the second bent portion 304 and a third arm portion 305. The second bent portion 304 is bent in such a manner as to protrude in a direction opposite to the first arm portion 301. The third arm portion 305 extends toward the first arm portion 301 as extending toward another end from one end connected to the second bent portion 304 at least in the assembled state. In other words, the third arm portion 305 extends between the second bent portion 304 and a third bent portion 306 toward the first arm portion 301 as extending away from the second bent portion 304. That is, the second bent portion 304 is positioned between the second arm portion 303 and the third arm portion 305. The second bent portion 304 is connected to the first bent portion 302, and is bent in such a manner as to extend toward the first arm portion 301 as extending away from the first bent portion 302.

The wire spring relay member 300 includes the third bent portion 306 and a fourth arm portion 307. The third bent portion 306 is bent in such a manner as to protrude toward the first arm portion 301 at least in the assembled state. The third bent portion 306 is connected to the third arm portion 305, and is bent in such a manner as to extend away from the first arm portion 301 as extending away from the third arm portion 305. The third bent portion 306 comes into contact with the second cut face 400c (500c) which is another face of the through-hole 400a (500a). Note that the third bent portion 306, which is connected to the second bent portion 304, may be bent in such a manner as to extend away from the first arm portion 301 as extending away from the second bent portion 304. The fourth arm portion 307 extends in a direction opposite to the first arm portion 301. In other words, the fourth arm portion 307 is connected to the third bent portion 306, and extends in such a manner as to extend away from the first arm portion 301 as extending away from the third bent portion 306.

The second bent portion 304 is bent in such a manner as to protrude in a direction opposite to the first arm portion 301. The second bent portion 304 serves as a slip-out prevention component for preventing the wire spring relay member 300 from slipping out of the through-hole 400a (500a) in a direction opposite to the insertion direction. A configuration in which the second bent portion 304 serves as the slip-out prevention component is described below. In the state in which the wire spring relay member 300 is inserted into the through-hole 400a (500a), an elastic force generated in the first bent portion 302 which is elastically deformed causes the third bent portion 306 to be away from the first arm portion 301. In such a manner, the first cut face 400b (500b) comes into contact with the first arm portion 301, and the second cut face 400c (500c) comes into contact with the third bent portion 306. In this state, a length from the first arm portion 301 to the second bent portion 304 is larger than a length from the first arm portion 301 to the third bent portion 306. In the state in which the wire spring relay member 300 is inserted into the through-hole 400a (500a), the second bent portion 304 is hooked on the end portion of the grounded member 400 (already grounded member 500) having the second cut face 400c (500c). Thus, the second bent portion 304 serves as the slip-out prevention component to prevent the wire spring relay member 300 from slipping out of the through-hole 400a (500a).

Now, description is made of a distance L1 that is the shortest width between the third bent portion 306 and the first arm portion 301 before the insertion of the wire spring relay member 300 into the through-hole 400a (500a), and a distance L2 that is the shortest width after the insertion. The distance L1 before insertion is larger than the distance L2 after insertion (L1>L2). This means that the first arm portion 301, the first bent portion 302, and the second arm portion 303 of the wire spring relay member 300 having flexibility (spring characteristic or elasticity) warp, thus enabling the insertion of the wire spring relay member 300 into the through-hole 400a (500a). The above-mentioned configuration can prevent the wire spring relay member 300 from being easily detached after the wire spring relay member 300 is connected to the grounded member 400 (already grounded member 500), during, for example, transportation of the apparatus.

The third bent portion 306 comes into contact with the second cut face 400c (500c) of the through-hole 400a (500a) when the wire spring relay member 300 is connected to the grounded member 400 (already grounded member 500). In such a manner, the wire spring relay member 300 comes into contact with the grounded member 400 (already grounded member 500) at two contact portions between the first arm portion 301 and the first cut face 400b (500b) and between the third bent portion 306 and the second cut face 400c (500c). This improves reliable electrical conduction. The fourth arm portion 307 extends in a direction opposite to the first arm portion 301, and thus serves as the slip-out prevention component to prevent the third bent portion 306 from slipping out into the insertion direction.

The grounded member 400 (already grounded member 500) is made of the metal plate, and hence the wire spring relay member 300 may come into contact with a front face or a rear face of the grounded member 400 (already grounded member 500). However, it is preferred that the wire spring relay member 300 come into contact with the cut faces of the through-hole 400a (500a). The front face and the rear face of the metal plate may be subject to coating. However, in such a case, it is difficult to provide electrical connection on the front face and the rear face of the metal plate. Meanwhile, the cut faces of the through-hole in the metal plate are not affected by the coating, and hence electrical connection is easily provided. For this reason, the wire spring relay member 300 is configured to come into contact with the first cut face 400b (500b) and the second cut face 400c (500c) of the through-hole 400a (500a) formed in the grounded member 400 (already grounded member 500).

In FIG. 2A and FIG. 2B, the second arm portion 303 has a linear shape. However, but the second arm portion 303 may have a curved shape. Further, in FIG. 2A and FIG. 2B, a portion 310 including the first arm portion 301, the first bent portion 302, and the second arm portion 303, and a portion 311 including the second arm portion 303, the second bent portion 304, and the third arm portion 305 are in the same imaginary plane. However, the portion 310 and the portion 311 may be in different imaginary planes, that is, the second arm portion 303 may be twisted. Further, in FIG. 2A and FIG. 2B, the portion 311 including the second arm portion 303, the second bent portion 304, and the third arm portion 305, and a portion 312 including the third arm portion 305, the third bent portion 306, and the fourth arm portion 307 are in the same imaginary plane. However, the portion 311 and the portion 312 may be in different imaginary planes, that is, the third arm portion 305 may be twisted.

(Application to Printer)

Figure 3:
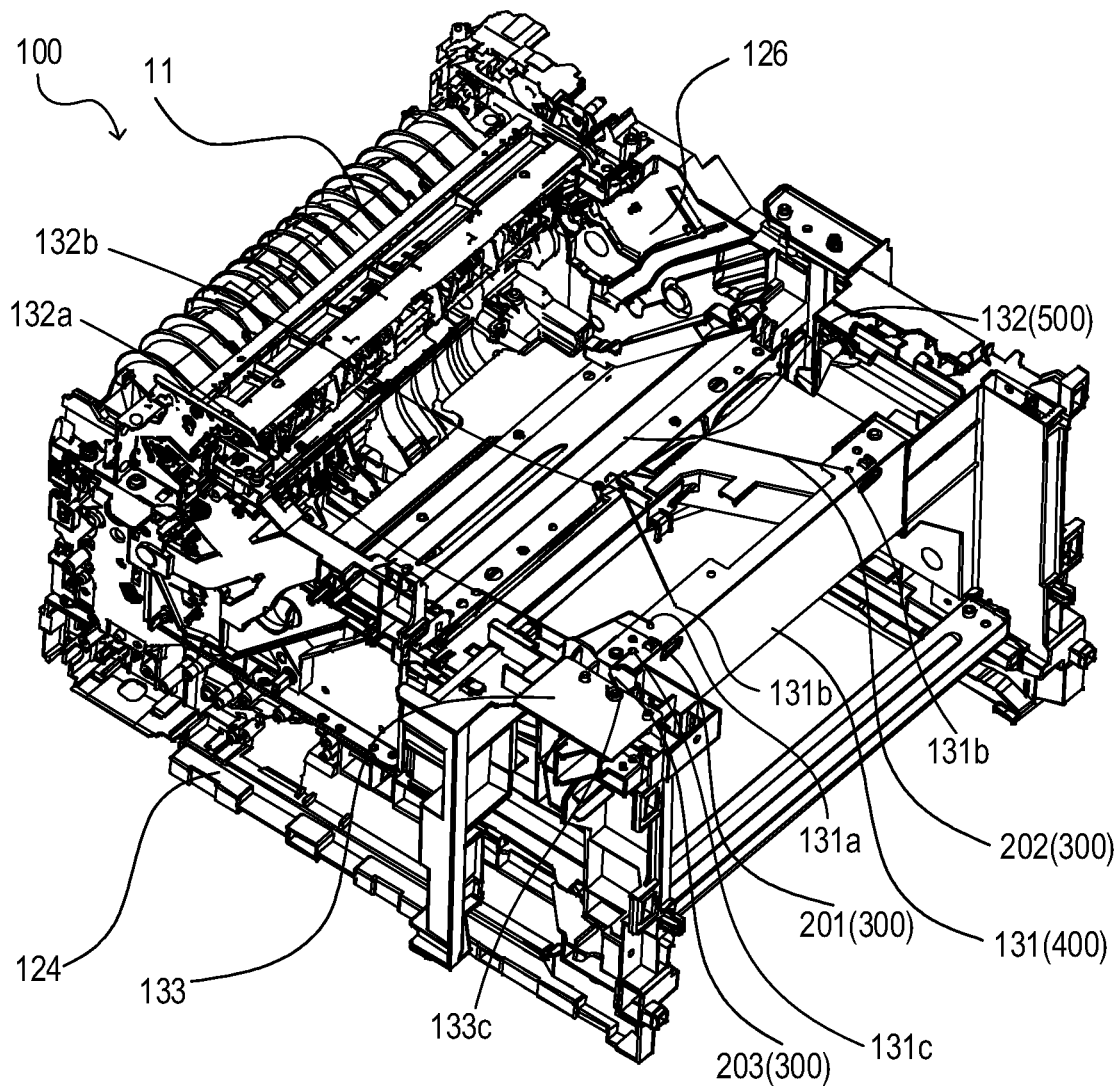
FIG. 3 is a detailed perspective view for illustrating an inside of the printer according to the first to third embodiments.

Application of the wire spring relay member 300 to the printer 100 is described with reference to FIG. 3. The center reinforcing member 132 as the already grounded member 500 and the front reinforcing member 131 as the grounded member 400 are disposed at positions apart from each other. In this case, the center reinforcing member 132 and the front reinforcing member 131 can be electrically connected to each other through use of the wire spring relay member 300.

The wire spring relay member 300 can be formed into various shapes in accordance with positions for use. The wire spring relay member 300 may have such a configuration that, like a wire spring relay member 201, one through-hole 132a of the center reinforcing member 132 is connected to one through-hole 131a of the front reinforcing member 131 (one-to-one connection), for example, even in the case in which the center reinforcing member 132 is connected to the front reinforcing member 131. The wire spring relay member 300 may have such a configuration that, like a wire spring relay member 202, for example, one through-hole 132b of the center reinforcing member 132 is connected to two through-holes 131b of the front reinforcing member 131 (one-to-two connection).

Further, the wire spring relay member 300 can be used not only for connection between the metal plates but also for electrical connection between the metal plates and a copper foil pattern forming a circuit on a board. The wire spring relay member 300 may have a configuration like a wire spring relay member 203, for example, such a configuration that a screw seat conductive portion 133c of an electrical component board 133 is connected to a through-hole 131c of the front reinforcing member 131. Further, in FIG. 3, a wire spring relay member (204: see FIG. 7A and FIG. 7B) is applicable also to a case in which a universal serial bus (USB) metal plate (not shown) is connected to the front reinforcing member 131. The USB metal plate is described in the fourth embodiment. The wire spring relay members 201 to 204 are described in detail below.

First Embodiment: Wire Spring Relay Member 201

Figure 4A:
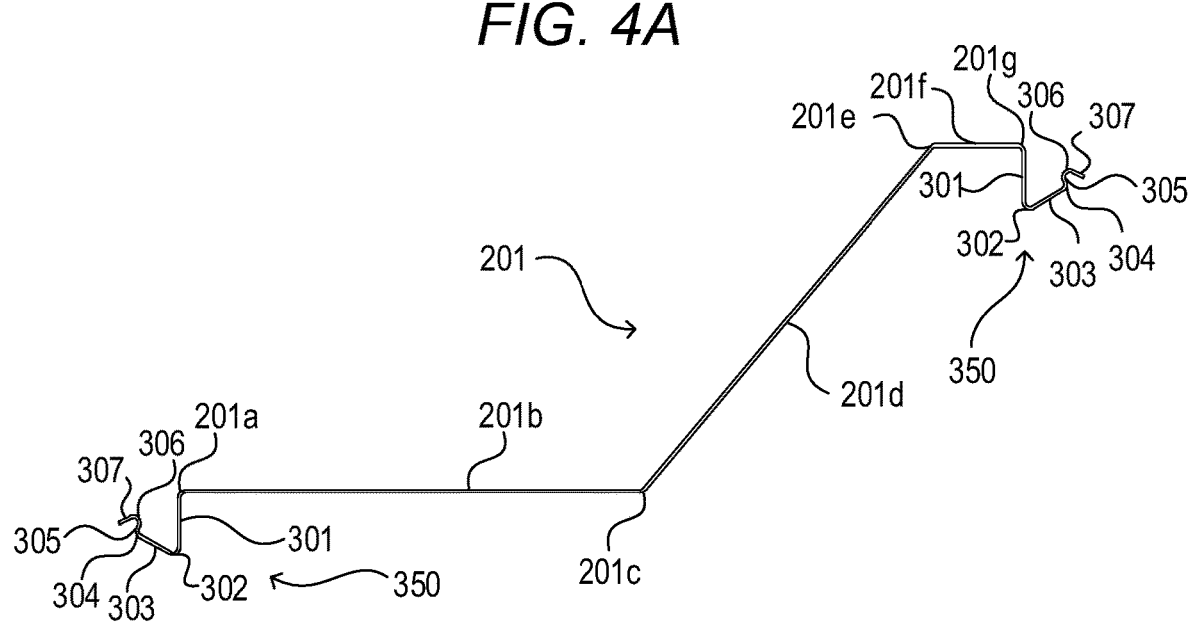
FIG. 4A is a perspective view of the wire spring relay member according to the first embodiment.
Figure 4B:
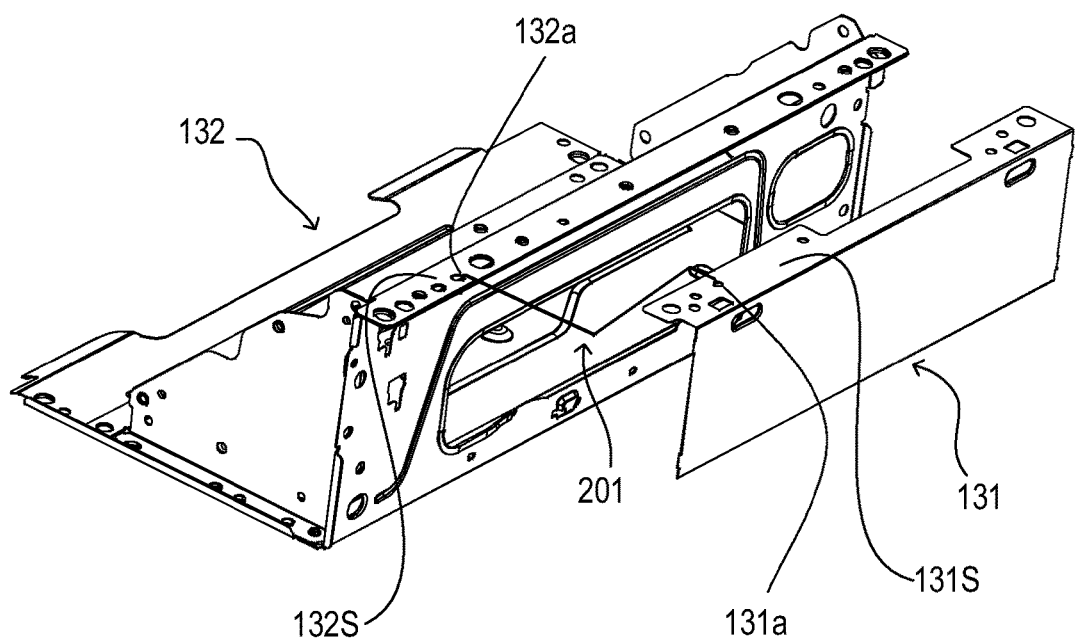
FIG. 4B is a view for illustrating application of the wire spring relay member according to the first embodiment to the printer.

FIG. 4A is a view for illustrating an overall configuration of the wire spring relay member 201 as the conductive member. FIG. 4B is a view for illustrating a state of connection between the center reinforcing member 132 (first member) and the front reinforcing member 131 (second member) via the wire spring relay member 201. Both ends of the wire spring relay member 201 each have the connection portion 350, described with reference to FIG. 2A, including the first arm portion 301, the first bent portion 302, the second arm portion 303, the second bent portion 304, the third arm portion 305, the third bent portion 306, and the fourth arm portion 307. The wire spring relay member 201 further includes a first bent portion 201a, a first linear portion 201b, a second bent portion 201c, a second linear portion 201d, a third bent portion 201e, a third linear portion 201f, and a fourth bent portion 201g.

The first bent portion 201a which is bent at a substantially right angle is connected to the first arm portion 301 at one end connected to the through-hole 132a (first through-hole) as an example of the cutaway portion of the center reinforcing member 132 as the metal plate member. The first linear portion 201b continuously extends between the first bent portion 201a and the second bent portion 201c. A change in direction of the wire spring at the first bent portion 201a enables the first linear portion 201b to extend substantially parallel to a face 132S of the center reinforcing member 132 having the through-hole 132a. This can minimize a space required in a heightwise direction of the wire spring relay member 201.

The second linear portion 201d extends continuously from the second bent portion 201c to the third bent portion 201e. The third bent portion 201e is disposed to guide the wire spring relay member 201 toward the through-hole 131a of the front reinforcing member 131. The third linear portion 201f extends continuously from the third bent portion 201e to the fourth bent portion 201g. This allows the wire spring relay member 201 to reach the through-hole 131a (second through-hole) as an example of the cutaway portion of the front reinforcing member 131 as the metal plate member.

The second bent portion 201c is disposed at least one position in an intermediate portion of the wire spring relay member 201. The second bent portion 201c accommodates variations in alignment between the through-hole 131a of the front reinforcing member 131 and the through-hole 132a of the center reinforcing member 132 resulting from a geometric tolerance due to misalignment between the through-hole 131a and the through-hole 132a. The second bent portion 201c accommodates also variations in dimension of the wire spring relay member 201 resulting from a dimensional tolerance of the wire spring relay member 201. Further, the second bent portion 201c accommodates fluctuations in distance between the center reinforcing member 132 and the front reinforcing member 131 resulting from deformation of the frame of the printer 100.

The fourth bent portion 201g is connected to the first arm portion 301 at the another end being connected to the through-hole 131a of the front reinforcing member 131. A change in direction of the wire spring at the fourth bent portion 201g enables the third linear portion 201f to extend substantially parallel to a face 131S of the front reinforcing member 131 having the through-hole 131a. This can minimize a space required in a heightwise direction of the wire spring relay member 201.

Bent angles and bent directions of the first bent portion 201a, the second bent portion 201c, the third bent portion 201e, and the fourth bent portion 201g are variable in accordance with the positions of the through-hole 132a and the through-hole 131a. Further, it is not always required that a linear portion such as the third linear portion 201f for the change in the direction be provided, or a plurality of linear portions may be provided. In place of the linear portions, curved portions may be provided. The linear portions or the bent portions are disposed suitably at the two connection portions 350 and freely vary the shape of the wire spring relay member 201, thus improving a degree of freedom in arrangement. Further, the wire spring relay member 201 which is less liable to slip out and is inexpensive can be provided. According to the first embodiment, the conductive member which is inexpensive and has a high degree of freedom in arrangement and reliable electrical conduction can be provided.

Second Embodiment: Wire Spring Relay Member 202

Figure 5A:
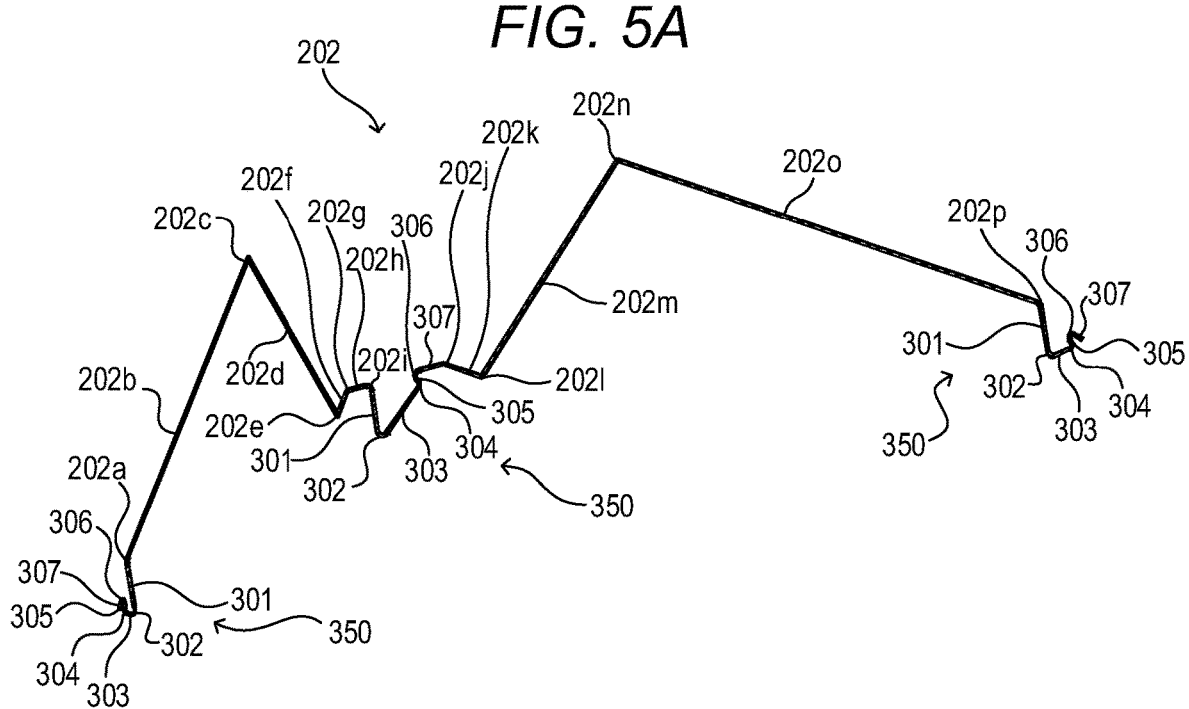
FIG. 5A is a perspective view of the wire spring relay member according to the second embodiment.
Figure 5B:
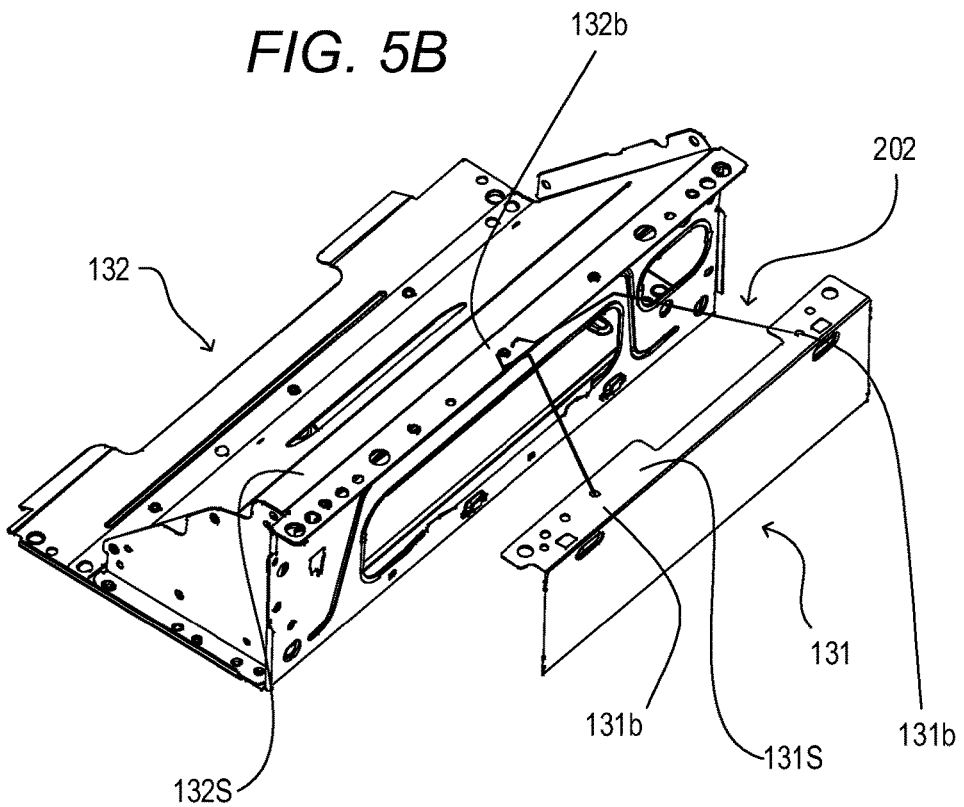
FIG. 5B is a view for illustrating application of the wire spring relay member according to the second embodiment to the printer.

The wire spring relay member 202 as the conductive member is described below. The configuration of the printer 100 is similar to that illustrated in FIG. 3 and described in the first embodiment. The front reinforcing member 131 (second member), which is a large metal plate in the printer 100, needs a great deal of space for a static eliminator. In other words, the plurality of through-holes 131b (at least two second through-holes) as an example of cutaway portions needs to be formed through the front reinforcing member 131 for establishing a ground on a plurality of places in some cases. FIG. 5A is a view for illustrating an overall configuration of the wire spring relay member 202. FIG. 5B is a view for illustrating a state of connection between the center reinforcing member 132 (first member) and the front reinforcing member 131 via the wire spring relay member 202.

The wire spring relay member 202 has, not only at both the ends thereof but also at substantially center portion thereof, the connection portion 350, described with reference to FIG. 2A, including the first arm portion 301, the first bent portion 302, the second arm portion 303, the second bent portion 304, the third arm portion 305, the third bent portion 306, and the fourth arm portion 307. Note that the connection portion 350 disposed on the center portion may be disposed on any portion between both the ends in place of the center portion. The wire spring relay member 202 further includes a first bent portion 202a, a first linear portion 202b, a second bent portion 202c, a second linear portion 202d, a third bent portion 202e, a third linear portion 202f, a fourth bent portion 202g, and a fourth linear portion 202h. The wire spring relay member 202 further includes a fifth bent portion 202i, a sixth bent portion 202j, a fifth linear portion 202k, a seventh bent portion 202l, a sixth linear portion 202m, an eighth bent portion 202n, a seventh linear portion 202o, and a ninth bent portion 202p.

The first bent portion 202a is connected to the first arm portion 301 at one end of the wire spring relay member 202. A change in direction of the wire spring at the first bent portion 202a enables the first linear portion 202b to extend substantially parallel to the face 131S of the front reinforcing member 131 having the through-holes 131b. The ninth bent portion 202p is connected to the first arm portion 301 at another end of the wire spring relay member 202. A change in direction of the wire spring at the ninth bent portion 202p enables the seventh linear portion 202o to extend substantially parallel to the face 131S of the front reinforcing member 131 having the through-holes 131b.

The fifth bent portion 202i is connected to the first arm portion 301 at the center portion of the wire spring relay member 202. The fifth bent portion 202i makes the extending direction be different between the fourth linear portion 202h and the first arm portion 301 at the center portion. As a result, the fourth linear portion 202h can be substantially parallel to the face 132S of the center reinforcing member 132 having the through-hole 132b (first through-hole) as an example of the cutaway portion. The sixth bent portion 202j is connected to the fourth arm portion 307 at the center portion of the wire spring relay member 202. A change in direction of the wire spring at the sixth bent portion 202j enables the fifth linear portion 202k to extend substantially parallel to the face 132S of the center reinforcing member 132 having the through-hole 132b.

The second bent portion 202c and the eighth bent portion 202n accommodate variations in the positions of the through-holes 131b of the front reinforcing member 131 and the through-hole 132b of the center reinforcing member 132 resulting from a geometric tolerance due to misalignment between the through-holes 131b and the through-hole 132b. The second bent portion 202c and the eighth bent portion 202n further accommodate variations in dimension of the wire spring relay member 202 resulting from a dimensional tolerance. Further, the second bent portion 202c and the eighth bent portion 202n accommodate also fluctuations in distance between the center reinforcing member 132 and the front reinforcing member 131 resulting from deformation of the frame of the printer 100. Note that the bent portions and the linear portions may vary in numbers, bent angles, and bent directions of the wire spring relay member 202 in accordance with its connection position. In place of the linear portions, curved portions may be provided.

The linear portions and the bent portions can be suitably disposed at three connection portions 350, and can freely change the shape of the wire spring relay member 202, thus improving the degree of freedom in arrangement. Further, the wire spring relay member 202 which is less liable to slip out, inexpensive, and stable can be provided. According to the second embodiment, the conductive member which is inexpensive and has the high degree of freedom in arrangement and the reliable electrical conduction can be provided.

Third Embodiment: Wire Spring Relay Member 203

Figure 6A:
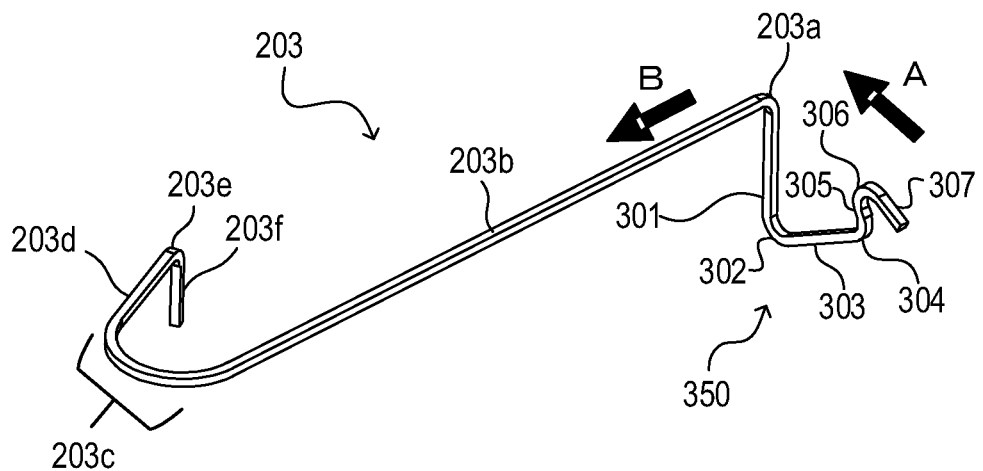
FIG. 6A is a perspective view of the wire spring relay member according to the third embodiment.
Figure 6B:
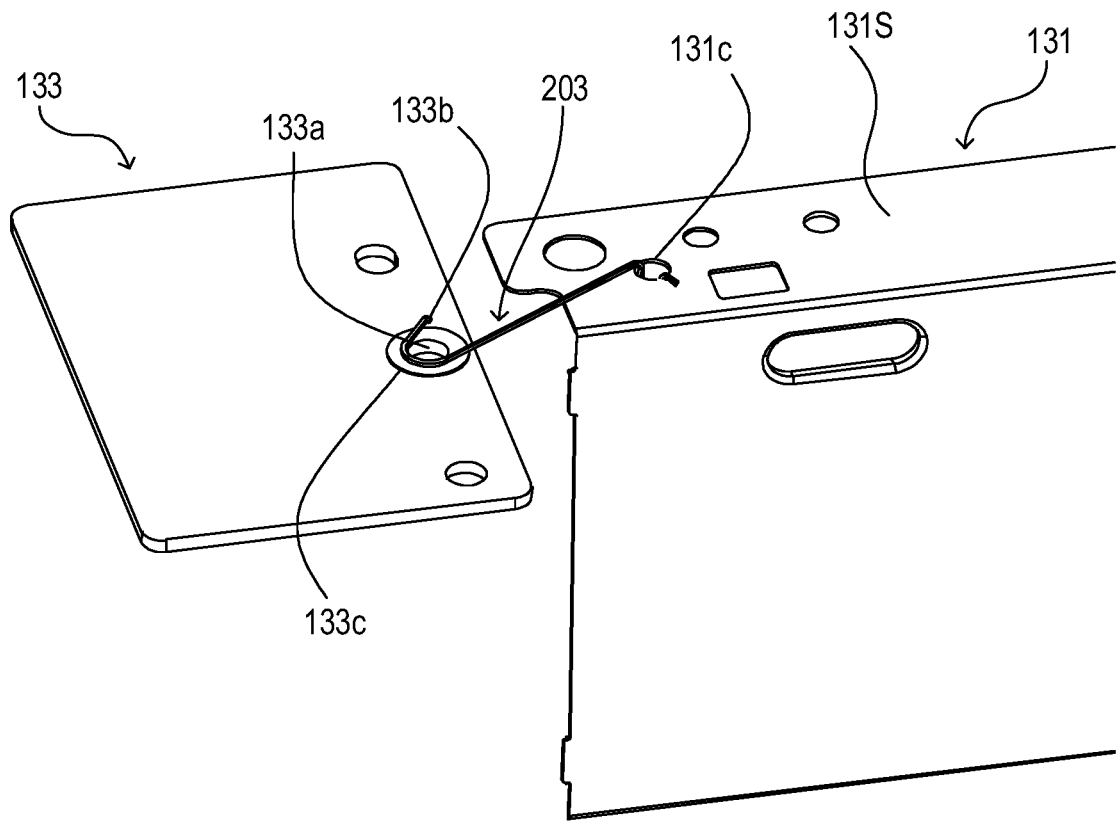
FIG. 6B is a view for illustrating application of the wire spring relay member according to the third embodiment to the printer.

The wire spring relay member 203 as the conductive member is described. In the third embodiment, the wire spring relay member 203 is used for connection between the copper foil pattern forming the circuit on the electrical component board 133 (second member) and the already grounded member. The front reinforcing member 131 (first member), which is connected to the center reinforcing member 132 via the wire spring relay member 201 or 202 described above, is used as the already grounded member. The electrical component board 133 without a part such as a metal plate nearby is grounded by connecting the copper foil pattern with the already grounded member via the wire spring relay member 203. FIG. 6A is a view for illustrating an overall configuration of the wire spring relay member 203. FIG. 6B is a view for illustrating a state of connection between the electrical component board 133 and the front reinforcing member 131 via the wire spring relay member 203. The electrical component board 133 has a screw hole 133a for screw fastening and a hole portion 133b as an insertion hole for insertion of the wire spring relay member 203. The screw seat conductive portion 133c (conductive portion), which is a screw seat formed along the screw hole 133a by a copper foil pattern, is disposed around the screw hole 133a. The screw seat conductive portion 133c is connected to the already grounded member, and thus serves also as a ground portion of the electrical component board 133.

The wire spring relay member 203 includes the connection portion 350 disposed at its one end as described in FIG. 2A. The connection portion 350 includes the first arm portion 301, the first bent portion 302, the second arm portion 303, the second bent portion 304, the third arm portion 305, the third bent portion 306, and the fourth arm portion 307. Further, the wire spring relay member 203 includes a first bent portion 203a which is connected to the first arm portion 301, a first linear portion 203b, an arc portion 203c, a second linear portion 203d, a second bent portion 203e, and a third linear portion 203f (linear portion to be inserted into a fixing hole). An arrow A indicates a direction from the third bent portion 306 to the first arm portion 301. This direction is, hereinafter, described as a direction A. An arrow B indicates a direction from the first bent portion 203a along the first linear portion 203b. This direction is, hereinafter, described as a direction B. The wire spring relay member 203 is configured such that the direction A is substantially orthogonal to the direction B.

The arc portion 203c is configured to come into contact with the screw seat conductive portion 133c and surround, for example, halfway around the screw hole 133a. Note that the arc portion 203c comes into contact with the screw seat conductive portion 133c and has a contact portion of any length in place of the half-circumferential portion. A part of the first linear portion 203b, the arc portion 203c, and the second linear portion 203d come into contact the face of the electrical component board 133. The wire spring relay member 203 is bent at an angle of about 90° at the second bent portion 203e, and thus the wire spring relay member 203 is orthogonal to the face of the electrical component board 133. The wire spring relay member 203 is fixed to the electrical component board 133 by inserting the third linear portion 203f into the hole portion 133b. The electrical component board 133, the end portion of the wire spring relay member 203, and a mold part (not shown) on the wire spring relay member 203, are fastened together with a screw.

The connection portion 350 of the wire spring relay member 203 is inserted into the through-hole 131c (first through-hole) as an example of the cutaway portion in the face 131S of the front reinforcing member 131.

The inexpensive wire spring relay member 203 can be used in this configuration including such a component like the electrical component board 133 (circuit board) which includes the screw hole 133a having the cut faces (side faces) without electrical conduction in a case in which the other component (front reinforcing member 131) is a metal plate. According to the third embodiment, the wire spring relay member 203 can be freely changed into various shapes by disposing the linear portions and the bent portions suitably between the end portion having the connection portion 350 and the end portion that comes into contact with the electrical component board 133. This can provide the conductive member that is inexpensive and has the high degree of freedom in arrangement and the reliable electrical conduction.

Fourth Embodiment: Wire Spring Relay Member 204

Figure 7A:
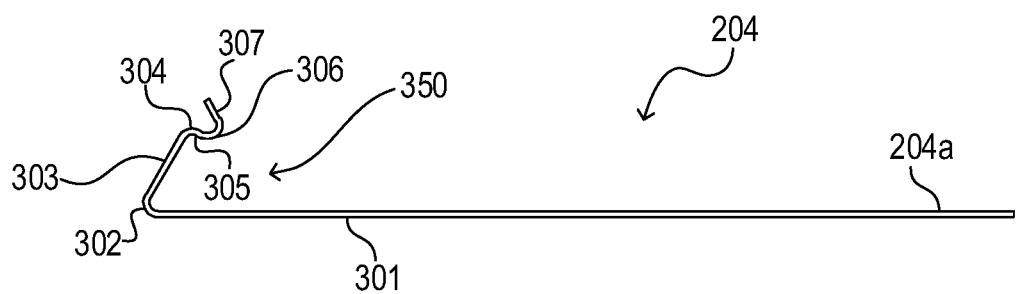
FIG. 7A is a perspective view of the wire spring relay member according to the fourth embodiment.
Figure 7B:
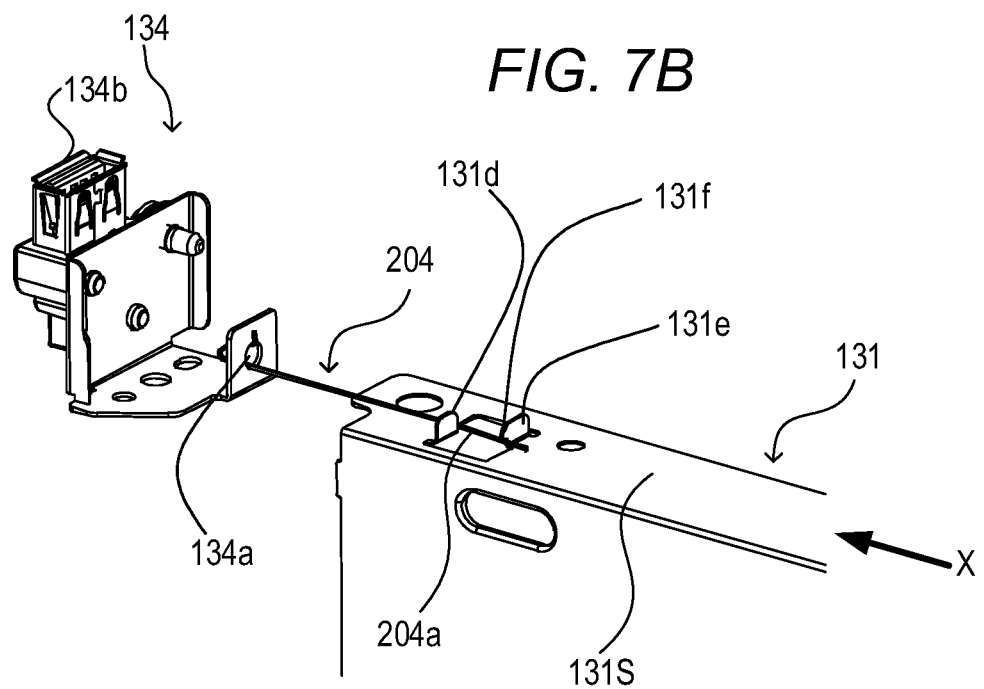
FIG. 7B is a view for illustrating application of the wire spring relay member according to the fourth embodiment to the printer.

The wire spring relay member 204 as the conductive member is described. In the fourth embodiment, the wire spring relay member 204 is used for connection between a USB metal plate 134 (second member) and the already grounded member. The USB metal plate 134 is a metal plate that has a USB port 134b for connecting a USB connector to the printer 100 and is connected to a metal housing. The front reinforcing member 131, which is connected to the center reinforcing member 132 via, for example, the wire spring relay members 201 and 202, described above, is the already grounded member. FIG. 7A is a view for illustrating an overall configuration of the wire spring relay member 204. FIG. 7B is a view for illustrating a state of connection between the USB metal plate 134 and the front reinforcing member 131 via the wire spring relay member 204. The USB metal plate 134 is, as illustrated in FIG. 7B, disposed to be separated from the front reinforcing member 131.

The USB metal plate 134 has a through-hole 134a (second through-hole) as an example of the cutaway portion for connecting the wire spring relay member 204. Meanwhile, the face 131S of the front reinforcing member 131 has a wire spring contact portion 131d as a first contact portion and a wire spring contact portion 131e as a second contact portion which contact the wire spring relay member 204 and fix it. Here, a direction of arrow X is along the first arm portion 301 of the wire spring relay member 204. The wire spring contact portion 131d and the wire spring contact portion 131e are disposed to be partially aligned with each other when being viewed from the direction of arrow X in FIG. 7B. The wire spring relay member 204 (first arm portion 301) having one end fixed to the through-hole 134a is deformed by the wire spring contact portion 131d disposed between the through-hole 134a and the wire spring contact portion 131e. Another end of the wire spring relay member 204 comes into contact with the wire spring contact portion 131e. This regulates a motion of the wire spring relay member 204. Further, the wire spring contact portion 131e has a slip-out prevention portion 131f for regulating a motion of the wire spring relay member 204 to a direction orthogonal to the face 131S. Note that the wire spring contact portion 131d may also have the slip-out prevention portion 131f.

The wire spring relay member 204 includes the connection portion 350 at its one end as described with reference to FIG. 2A. The connection portion 350 includes the first arm portion 301, the first bent portion 302, the second arm portion 303, the second bent portion 304, the third arm portion 305, the third bent portion 306, and the fourth arm portion 307. The wire spring relay member 204 has such a configuration that the first arm portion 301 extends linearly to an end portion 204a at the another end. The first arm portion 301 extends to the end portion 204a, and the end portion 204a comes into contact with the wire spring contact portion 131d and the wire spring contact portion 131e of the front reinforcing member 131. The wire spring relay member 204 is deformed, and is fitted into the front reinforcing member 131 to reach the slip-out prevention portion 131f and be hooked on the slip-out prevention portion 131f.

In FIG. 7B, the wire spring relay member 204 is connected so that an imaginary plane including the portions 310, 311, and 312, described with reference to FIG. 2B, is substantially orthogonal to the face 131S of the front reinforcing member 131. However, it is not always required that the imaginary plane including the portions 310, 311, and 312 be substantially orthogonal to the face 131S of the front reinforcing member 131. Further, the end portion 204a of the wire spring relay member 204 may be used as the connection portion 350 to provide the connection with the front reinforcing member 131 like the first embodiment.

Such a configuration causes the wire spring relay member 204 to have a simpler shape, thus providing the inexpensive wire spring relay member 204. According to the fourth embodiment, the wire spring relay member 204 can be freely changed into various shapes by disposing the linear portions and the bent portions suitably between the connection portion 350 and the end portion 204a. This can provide the conductive member that is inexpensive and has the high degree of freedom in arrangement and the reliable electrical conduction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-011000, filed Jan. 27, 2020, which is hereby incorporated by reference herein in its entirety.

What is claimed is:

1. A conductive member which is to be electrically connected to a metal plate member having a receiving portion having two faces opposed to each other, the conductive member comprising a connection portion which is to be connected to the receiving portion,
wherein the connection portion comprises:
a first arm portion, which extends from one end to another end, and is configured to come into contact with one face of the two faces of the receiving portion;
a first bent portion, which is connected to the another end of the first arm portion, and is bent in such a manner as to extend toward a direction from the another end of the first arm portion toward the one end of the first arm portion;
a second bent portion, which is connected to the first bent portion, and is bent getting closer toward the first arm portion as getting away from the first bent portion; and
a third bent portion, which is connected to the second bent portion, and is bent getting away from the first arm portion as getting away from the second bent portion so as to come into contact with another face of the two faces of the receiving portion.

2. The conductive member according to claim 1, wherein a smallest width between the third bent portion and the first arm portion when the conductive member is not connected to the metal plate member is larger than a smallest width between the third bent portion and the first arm portion when the conductive member is connected to the metal plate member.

3. The conductive member according to claim 1, wherein the connection portion comprises:
   a second arm portion which extends between the first bent portion and the second bent portion in such a manner as to form an acute angle with respect to the first arm portion; and
   a third arm portion which extends between the second bent portion and the third bent portion toward the first arm portion as getting away from the second bent portion.

4. The conductive member according to claim 3, wherein the connection portion comprises a fourth arm portion, which is connected to the third bent portion, and extends getting away from the first arm portion as getting away from the third bent portion.

5. The conductive member according to claim 1, wherein the receiving portion is a through hole into which the connection portion is inserted.

6. An image forming apparatus configured to form an image on a recording material, the image forming apparatus comprising:
   a conductive member;
   a ground member which is connected to a ground; and
   a grounded member,
   wherein the conductive member is electrically connected to a metal plate member having a receiving portion having two faces opposed to each other,
   wherein the conductive member comprises a connection portion which is connected to the receiving portion,
   wherein the connection portion comprises:
      a first arm portion, which extends from one end to another end, and is in contact with one face of the two faces of the receiving portion;
      a first bent portion, which is connected to the another end of the first arm portion, and is bent in such a manner as to extend toward a direction from the another end of the first arm portion toward the one end of the first arm portion;
      a second bent portion, which is connected to the first bent portion, and is bent getting closer toward the first arm portion as getting away from the first bent portion; and
      a third bent portion, which is connected to the second bent portion, and is bent getting away from the first arm portion as getting away from the second bent portion so as to be in contact with another face of the two faces of the receiving portion, and
   wherein one of the ground member and the grounded member is the metal plate member, and the ground member and the grounded member are connected to each other by the conductive member so that the grounded member is connected to the ground via the conductive member and the ground member.

7. The image forming apparatus according to claim 6, wherein the receiving portion is a through-hole into which the connection portion is inserted.

8. The image forming apparatus according to claim 6, wherein the ground member is the metal plate member,
   wherein the grounded member is a board on which a circuit is formed, and
   wherein the ground member and the circuit of the grounded member are connected to each other by the conductive member.

9. The image forming apparatus according to claim 8, wherein the board has a screw hole for screw fastening and a conductive portion disposed around the screw hole, and
   wherein the conductive member comprises one end connected to the connection portion, which is connected to the receiving portion of the ground member, and another end having an arc portion, which is in contact with the conductive portion.

10. The image forming apparatus according to claim 9, wherein the arc portion comprises one end connected to the connection portion and another end connected to a linear portion inserted into a through-hole provided in the board.

11. The image forming apparatus according to claim 8, wherein the conductive member comprises one end having the connection portion connected to the receiving portion of the ground member and another end having an end portion at which the first arm portion extending linearly is terminated,
   wherein the metal plate member comprises a first contact portion and a second contact portion provided between the first contact portion and the connection portion, and
   wherein the first arm portion is deformed at the second contact portion so that the first arm portion is in contact with the first contact portion.

12. The image forming apparatus according to claim 6, further comprising:
   a first side plate and a second side plate supporting the grounded member, the first side plate and the second side plate are each made of a mold.

13. The image forming apparatus according to claim 6, wherein the grounded member is configured to support a USB port.

14. An image forming apparatus configured to form an image on a recording material, the image forming apparatus comprising:
   a conductive member;
   a ground member, which is connected to a ground, and is a metal plate member having a first receiving portion having two faces opposed to each other; and
   a grounded member, which is a metal plate member having a second receiving portion having two faces opposed to each other,
   wherein the conductive member comprises a first connection portion and a second connection portion,
   wherein each of the first connection portion and the second connection portion comprises:
      a first arm portion, which extends from one end to another end, and is in contact with one face of the two faces of a corresponding one of the first receiving portion and the second receiving portion;
      a first bent portion, which is connected to the another end of the first arm portion, and is bent in such a manner as to extend toward a direction from the another end of the first arm portion toward the one end of the first arm portion;
      a second bent portion, which is connected to the first bent portion, and is bent getting closer toward the first arm portion as getting away from the first bent portion; and a third bent portion, which is connected to the second bent portion, and is bent getting away from the first arm portion as getting away from the second bent portion so as to be in contact with another face of the two faces of the corresponding one of the first receiving portion and the second receiving portion, wherein the first connection portion is connected to the first receiving portion of the ground member so that the ground member and the conductive member are electrically connected to each other, wherein the second connection portion is connected to the second receiving portion of the grounded member so that the grounded member and the conductive member are electrically connected to each other, and wherein the ground member and the grounded member are connected to each other by the conductive member so that the grounded member is connected to the ground via the conductive member and the ground member.

15. The image forming apparatus according to claim 14, wherein the first receiving portion is a first through-hole into which the first connection portion is inserted, and wherein the second receiving portion is a second through-hole into which the second connection portion is inserted.

16. The image forming apparatus according to claim 14, wherein the conductive member comprises at least one bent portion between the first connection portion and the second connection portion.

17. The image forming apparatus according to claim 14, further comprising:

a first side plate and a second side plate supporting the grounded member, the first side plate and the second side plate are each made of a mold.

18. The image forming apparatus according to claim 14, wherein the grounded member is configured to support a USB port.

\* \* \* \* \*